US007768536B2

(12) United States Patent
Hyatt (10) Patent No.: US 7,768,536 B2
(45) Date of Patent: Aug. 3, 2010

(54) METHODS OF DISPLAYING INFORMATION AT DIFFERENT ZOOM SETTINGS AND RELATED DEVICES AND COMPUTER PROGRAM PRODUCTS

(75) Inventor: Edward Craig Hyatt, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 479 days.

(21) Appl. No.: 11/733,899

(22) Filed: Apr. 11, 2007

(65) Prior Publication Data

US 2008/0252662 A1    Oct. 16, 2008

(51) Int. Cl.
*G09G 5/00*    (2006.01)
(52) U.S. Cl. .................. 345/660; 345/671; 345/670; 345/619
(58) Field of Classification Search ................. 345/660, 345/619, 670, 671; 715/864
See application file for complete search history.

(56) References Cited

U.S. PATENT DOCUMENTS

| | | | |
|---|---|---|---|
| 6,211,856 | B1 | 4/2001 | Choi et al. |
| 6,278,465 | B1 | 8/2001 | Nielsen |
| 6,449,639 | B1 | 9/2002 | Blumberg |
| 6,456,305 | B1 | 9/2002 | Qureshi et al. |
| 6,747,680 | B1 | 6/2004 | Igarashi et al. |
| 2002/0030699 | A1 | 3/2002 | Van Ee |
| 2004/0183817 | A1* | 9/2004 | Kaasila ....................... 345/660 |
| 2005/0283739 | A1 | 12/2005 | Mohr et al. |

OTHER PUBLICATIONS

International Search Report and Written Opinion (13 pages) corresponding to International Application No. PCT/US2007/023485; Mailing Date: Mar. 10, 2009.

\* cited by examiner

*Primary Examiner*—Chante Harrison
(74) *Attorney, Agent, or Firm*—Myers Bigel Sibley & Sajovec, P.A.

(57) ABSTRACT

A method of displaying pages of information on an electronic screen may include receiving a first page of information including first text, and rendering the first page of information including the first text on the electronic screen at a first zoom setting. After rendering the first page of information at the first zoom setting, zoom input may be accepted from a user through a user interface, and the first page of information including the first text may be rendered on the electronic screen at a second zoom setting different than the first zoom setting responsive to the zoom input. In addition, a target text size may be saved in electronic memory, and the target text size may represent a size of the first text on the electronic screen at the second zoom setting. A second page of information including second text different than the first text may be received, and a third zoom setting may be determined responsive to the target text size and responsive to the second text. The second page of information including the second text may then be rendered on the electronic screen at a third zoom setting. Related devices and computer program products are also discussed.

19 Claims, 5 Drawing Sheets

METHODS OF DISPLAYING INFORMATION AT DIFFERENT ZOOM SETTINGS AND RELATED DEVICES AND COMPUTER PROGRAM PRODUCTS

FIELD OF THE INVENTION

The present invention relates to the field of electronics, and more particularly to methods of displaying information and related devices.

BACKGROUND

Web Applications may be run on different displaying devices such as monitors (e.g., for desktop computers), handheld devices (e.g., personal digital assistants and/or handheld computers), mobile telephones, and/or other devices. Because the display area on such devices may vary, the presentation of information may be affected by the dimensions of a particular display device. For example, a personal digital assistant (PDA) may have a smaller display area than a desktop computer monitor, and therefore, an amount of information that can be displayed on a PDA may be less than the amount of information that can be displayed on a desktop computer monitor. Some displaying devices may enable a user to choose from different resolution settings of a display device, which may result in an increase or in a reduction of the size of the features displayed on the displaying device.

U.S. Patent Publication No. 2005/0283739 discusses a zoom function to improve usability of a web application. More particularly, an interface system for a portal application may include a view generator to generate an aggregate view including a plurality of display areas, and each display area of the plurality of display areas may be associated with a respective service accessible via the portal application. An extractor may receive a selection (from the user) indicating a user-selected portion of the aggregate view. The view generator may be configured to generate a zoom view corresponding to the user-selected portion of the aggregate view.

In addition, an auto-zoom for graphical display of a web page is discussed in U.S. Patent Publication No. 2002/0030699. A mobile phone may have a display with a touch screen and a browser capable of retrieving a Web page from the Internet The page may first be displayed in its entirety, and the user may recognize the page's general lay-out and presence of hyperlinks. When the user touches a particular location on the touch screen that corresponds to a portion of the page's image, the portion may be displayed so as to fill the display's area. Thus, the user can browse the Web with a display of limited size.

SUMMARY

According to some embodiments of the present invention, a method of displaying pages of information on an electronic screen may include receiving a first page of information including first text and rendering the first page of information including the first text on the electronic screen at a first zoom setting. After rendering the first page of information at the first zoom setting, zoom input may be accepted from a user through a user interface, and the first page of information including the first text may be rendered on the electronic screen at a second zoom setting different than the first zoom setting responsive to the zoom input. In addition, a target text size may be saved in electronic memory, and the target text size may represent a size of the first text on the electronic screen at the second zoom setting. A second page of information including second text different than the first text may be received, and a third zoom setting may be determined responsive to the target text size and responsive to the second text. The second page of information including the second text may be rendered on the electronic screen at a third zoom setting.

Determining the third zoom setting may include determining the third zoom setting responsive to the target text size and responsive to the second text to normalize a size of the second text rendered on the electronic screen at the third zoom setting relative to a size of the first text rendered on the electronic screen at the second zoom setting. The first page of information may include the first text and a first image, rendering the first page of information at the first zoom setting may include rendering the first text and the first image on the electronic screen at the first zoom setting, and rendering the first page of information at the second zoom setting may include rendering the first text and the first image on the electronic screen at the second zoom setting. In addition, the second page of information may include the second text and a second image, and rendering the second page of information at the third zoom setting may include rendering the second text and the second image on the electronic screen at the third zoom setting. Moreover, the second and third zoom settings may be different.

The first text may include text elements having a plurality of different sizes, and the target text size may represent a predominate one of the plurality of different sizes of the text elements of the first text rendered on the electronic screen at the second zoom setting. If the second text includes text elements having a plurality of different sizes, determining the third zoom setting may include determining the third zoom setting so that a predominate one of the plurality of different sizes of the text elements of the second text rendered on the electronic screen at the third zoom setting may be equal to the target text size.

The first text may include text elements having a plurality of different sizes, and the target text size may represent a least one of the plurality of different sizes of the text elements of the first text rendered on the electronic screen at the second zoom setting. If the second text includes text elements having a plurality of different sizes, determining the third zoom setting may include determining the third zoom setting so that a least one of the plurality of different sizes of the text elements of the second text rendered on the electronic screen at the third zoom setting is equal to the target text size.

The first text may include text elements having a plurality of different sizes, and the target text size may represent an intermediate one of the plurality of different sizes of the text elements of the first text rendered on the electronic screen at the second zoom setting. If the second text includes text elements having a plurality of different sizes, determining the third zoom setting may include determining the third zoom setting so that an intermediate one of the plurality of different sizes of the text elements of the second text rendered on the electronic screen at the third zoom setting is equal to the target text size.

The first text may include text elements having a plurality of different sizes, and the target text size may represent a greatest one of the plurality of different sizes of the text elements of the first text rendered on the electronic screen at the second zoom setting. If the second text includes text elements having a plurality of different sizes, determining the third zoom setting may include determining the third zoom setting so that a greatest one of the plurality of different sizes of the text elements of the second text rendered on the electronic screen at the third zoom setting is equal to the target text size.

Moreover, the electronic screen may be an electronic screen of a handheld electronic device such as a mobile terminal. In addition, each page of information may be a Web page or HTML document received from a remote server, or a page stored in memory of the handheld electronic device (such as a menu, options, or set up page).

Rendering the first page of information at the second zoom setting may include rendering a first portion of the first page of information including a first portion of the first text at the second zoom setting, and rendering a second portion of the first page of information including a second portion of the first text at the second zoom setting. Moreover, the first and second portions of the first text may have different text sizes. Accordingly, when scrolling between different portions of a same page, the zoom setting may remain unchanged until the user enters a new zoom setting. Accordingly, unnecessary and/or undesired zooming may be reduced.

Rendering the first page of information at the second zoom setting may include rendering a first portion of the first page of information including a first portion of the first text at the second zoom setting with the target text size representing a size of text of the first portion of the first text and rendering a second portion of the first page of information may include rendering a second portion of the first text at a fourth zoom setting with the first and second portions of the first text having different text sizes. Moreover, the fourth zoom setting may be selected responsive to the target text size and a size of text of the second portion of the first text. Rendering the first and second portions of the first page may include scrolling from the first portion of the first page to the second portion of the first page. Moreover, rendering the second portion of the first page may include rendering a portion of the first page at an intermediate zoom setting between the first and fourth zoom settings before rendering the second portion of the first page at the fourth zoom setting. Accordingly, text sizes may be normalized while scrolling between different portions of a same page, and transitions between different zoom settings may be smoothed.

According to some other embodiments of the present invention, a mobile terminal may include an electronic screen and a processor electrically coupled to the electronic screen. More particularly, the processor may be configured to receive a first page of information including first text, and to render the first page of information including the first text on the electronic screen at a first zoom setting. The processor may also be configured to accept zoom input from a user through a user interface after rendering the first page of information at the first zoom setting, and to render the first page of information including the first text on the electronic screen at a second zoom setting different than the first zoom setting responsive to the zoom input. In addition, the processor may be configured to save in electronic memory a target text size representing a size of the first text on the electronic screen at the second zoom setting. On receipt of a second page of information including second text different than the first text, the processor may be configured to determine a third zoom setting responsive to the target text size and responsive to the second text, and to render the second page of information including the second text on the electronic screen at a third zoom setting.

According to still other embodiments of the present invention, a computer program product may be configured to display pages of information on an electronic screen, and the computer program product may include a computer readable medium having computer readable program code embodied therein. More particularly, the computer readable program code may include computer readable program code configured to receive a first page of information including first text, and configured to render the first page of information including the first text on the electronic screen at a first zoom setting. Computer readable program code may also be configured to accept zoom input from a user through a user interface after rendering the first page of information at the first zoom setting, and to render the first page of information including the first text on the electronic screen at a second zoom setting different than the first zoom setting responsive to the zoom input. In addition, computer readable program code may be configured to save in electronic memory a target text size representing a size of the first text on the electronic screen at the second zoom setting. Moreover, computer readable program code may be configured to receive a second page of information including second text different than the first text, to determine a third zoom setting responsive to the target text size and responsive to the second text, and to render the second page of information including the second text on the electronic screen at a third zoom setting.

DETAILED DESCRIPTION

Embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first frequency below could be termed a second frequency, and similarly, a second frequency may be termed a first frequency without departing from the teachings of the present invention. As used herein, the term "and/or" includes any and all combinations of one or more of the associated listed items. The symbol "/" is also used as a shorthand notation for "and/or".

Various embodiments of the present invention are described below with reference to block diagrams illustrating methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. Accordingly, it will be appreciated that the block diagrams and operational illustrations support apparatus, methods and computer program products.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a compact disc read-only memory (CD-ROM).

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a Personal Digital Assistant (PDA) that may include an Internet/intranet access, Web browser, organizer, calendar, radio-telephone, pager, and/or a global positioning system (GPS) receiver; and a conventional laptop and/or palmtop computing device or other appliance that may include a radiotelephone or other transceiver. Mobile terminals may also be referred to as "Pervasive computing" devices.

For purposes of illustration, embodiments of the present invention are described herein in the context of a mobile terminal. It will be understood, however, that the present invention is not limited to such embodiments and may be embodied generally as an electronic device configured to display information on an electronic screen, such as an electronic device including a Web browser thereon.

According to embodiments of the present invention, a mobile terminal (such as a radiotelephone, a PDA, a palm top computer, etc.) may include a relatively small electronic screen (such as a liquid crystal display), and the mobile terminal may be configured to display (or render) pages of information (such as Web or HTML pages) on the relatively small electronic screen. The mobile terminal may be further configured to accept zoom inputs from a user through a user interface (such as a key, dial, touch sensitive portion of the electronic screen, joy stick, button, etc.) so that the user may zoom in and out to more easily view portions of a page on the relatively small electronic screen. Once the user has selected a particular zoom setting for a page, the mobile terminal may save (in electronic memory) a text size representing a size of text from the page on the screen at the selected zoom setting. When another page of information is selected for display on the electronic screen, the mobile terminal may use the saved text size to automatically select a zoom setting for the new page so that text of the new page is displayed on the electronic screen at the saved text size. In other words, once a user has manually selected a zoom setting for a first page, the mobile terminal may automatically select a zoom setting for initial display of a subsequent page to normalize a text size of the second page relative to a text size of the first page at the manually selected zoom setting.

Figure 1:
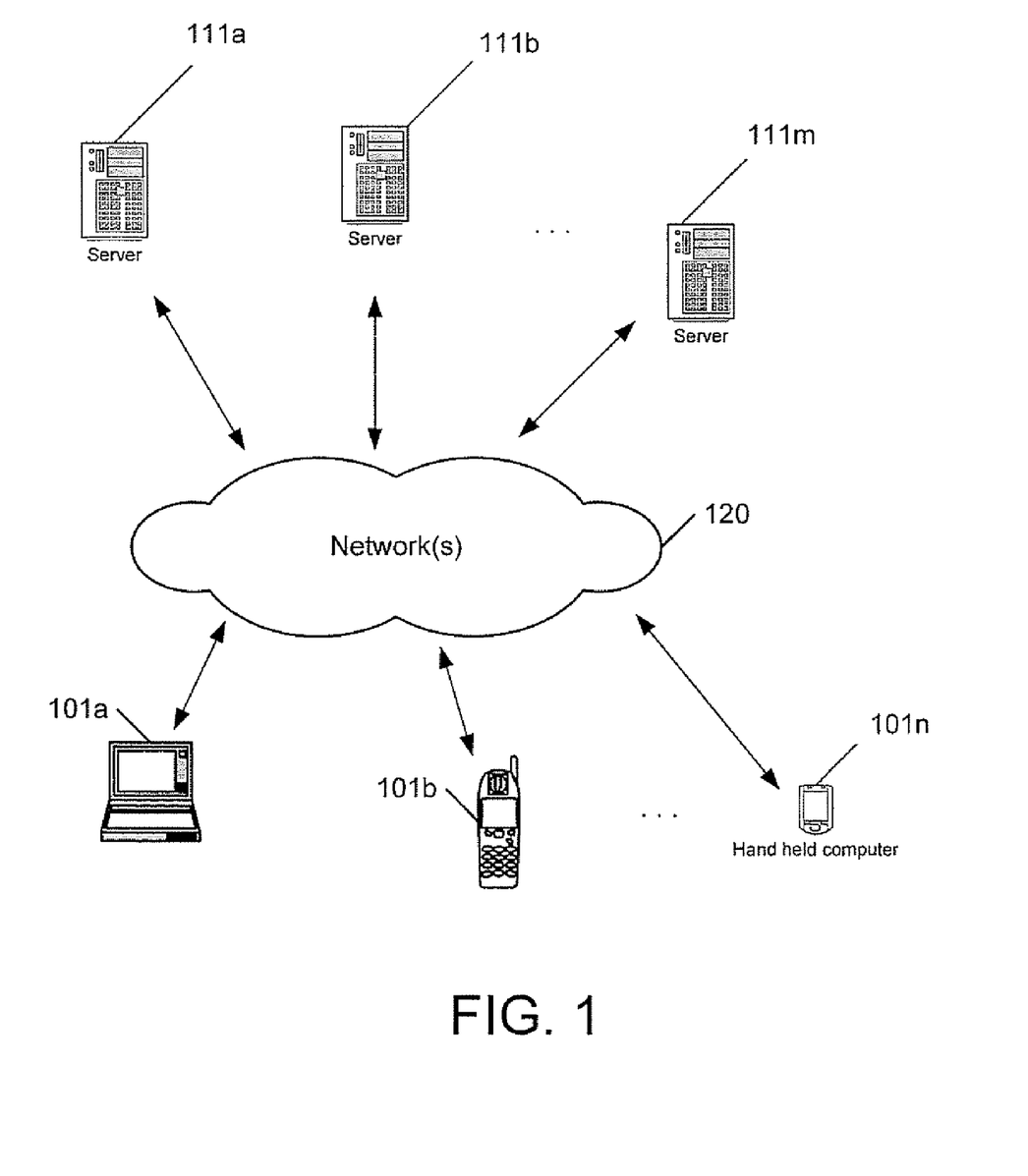
FIG. 1 is a schematic diagram of mobile terminals and servers coupled over a network according to some embodiments of the present invention.

As shown in FIG. 1, each of a plurality of mobile terminals 101*a*-101*n* including a web browser may communicate over communications network 120 with a respective one or more of the servers 111*a*-111*m* according to some embodiments of the present invention. More particularly, couplings between each of the mobile terminals 101*a*-101*n* may be provided over a wire line coupling (such as over a co-axial cable network coupling, a copper telephone network coupling, a fiber optic telephone network coupling, etc.) and/or over a wireless coupling (such as over a satellite network coupling, a radiotelephone network coupling, a WiFi coupling, a Bluetooth coupling, a Cellular Digital Packet Data or CDPD coupling, a General Packet Radio Service or GPRS coupling, an Enhanced Data GPRS or EDGE coupling, etc.) Accordingly, each of the mobile terminals 101*a*-101*n* may be configured to display web pages (also referred to as HyperText Markup Language or HTML documents) from one or more of the servers 111*a*-111*m*.

The various elements of the communication network 120 may be connected by a global network, such as the Internet or other publicly accessible network. Various elements of the network may be interconnected by a wide area network, a local area network, an Intranet, and/or other private network, which may not be accessible by the general public. Thus, the communication network 120 may represent a combination of public and private networks or a virtual private network (VPN). Although FIG. 1 illustrates an exemplary communication network, it will be understood that the present invention is not limited to such configurations, but is intended to encompass any configuration capable of carrying out the operations described herein.

Figure 2:
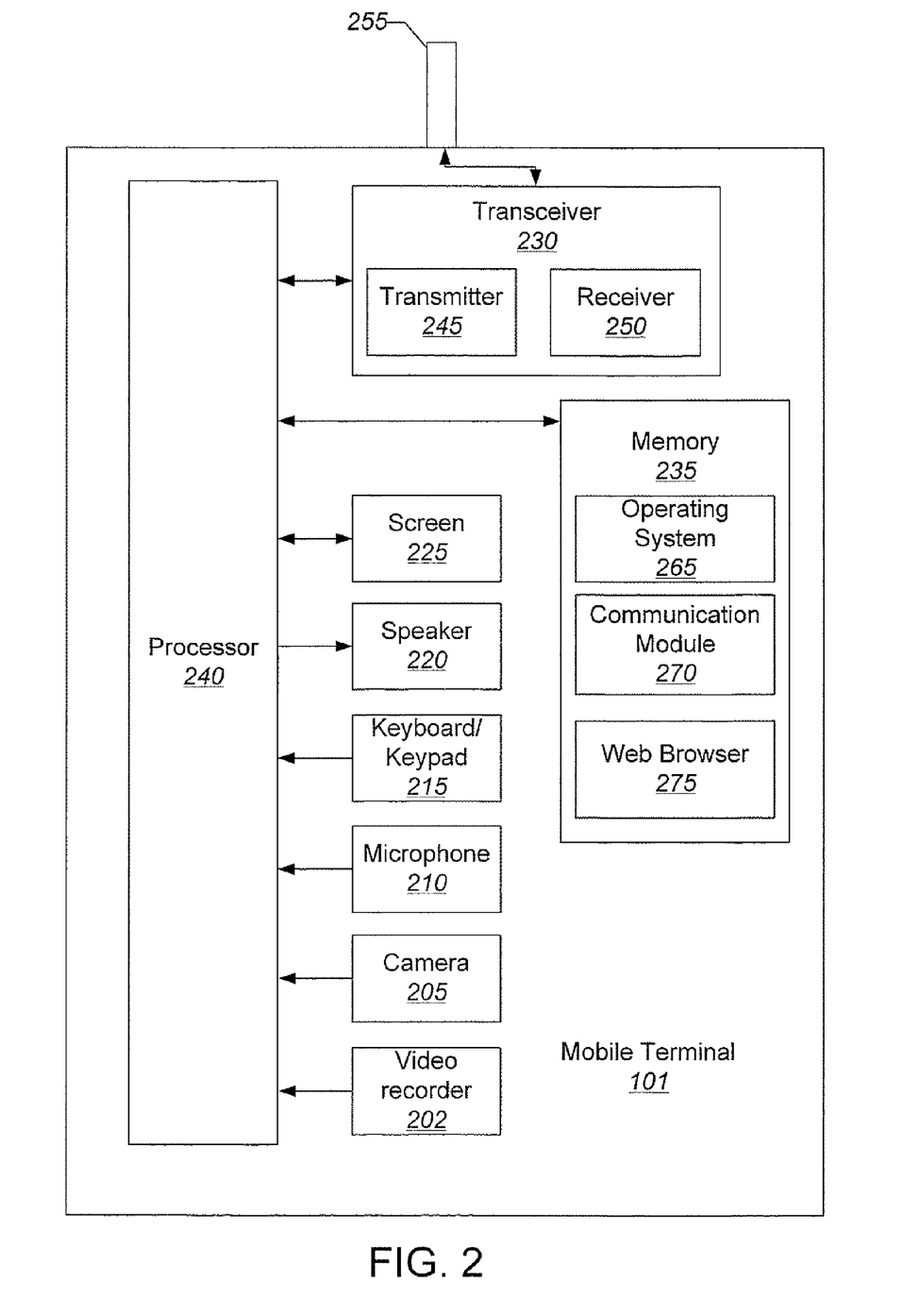
FIG. 2 is a block diagram of a mobile terminal according to some embodiments of the present invention.

FIG. 2 is a block diagram of a mobile terminal 101 that may be used to implement any one of the mobile terminals 101a-101n of FIG. 1, in accordance with some embodiments of the present invention. The mobile terminal 101, for example, may include a video recorder 202, a camera 205, a microphone 210, a keyboard/keypad 215, a speaker 220, an electronic screen 225 or display (such as a liquid crystal display or LCD), a transceiver 230, and a electronic memory 235 that communicate with a processor 240. The transceiver 230 may include a transmitter circuit 245 and a receiver circuit 250, which respectively transmit outgoing radio frequency signals to base station transceivers and receive incoming radio frequency signals from the base station transceivers via an antenna 255. The radio frequency signals transmitted between the mobile terminal 101 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 101 may be included in many conventional mobile terminals and their functionality is generally known to those skilled in the art.

While the elements of FIG. 2 are provided by way of example, not all elements of FIG. 2 are required for all mobile terminals according to embodiments of the present invention. For example, the microphone 210 and/or the speaker 220 may be omitted if the mobile terminal 101 is a PDA or other device that does not provide voice communications. Moreover, the transceiver 230 may be omitted if a wire line or other physical coupling is provided between the mobile terminal 101 and the network 120. The camera 205 and/or the video recorder 202 may also be omitted. Elements of the mobile terminal 101 or portions thereof may also be combined. For example, a separate keyboard/keypad or portions thereof may be omitted if user input may be accepted through a touch sensitive portion of the screen 225. Additional elements not shown in FIG. 2 (such as a dial, a joy stick, etc.) may also be included in mobile terminals according to embodiments of the present invention. Elements of mobile terminal 101 used to accept input from a user and/or provide output to a user (such as screen 225, keyboard/keypad 215, speaker 220, microphone 210, etc.) may be collectively referred to as a user interface.

The processor 240 communicates with the electronic memory 235 via an address/data bus. The processor 240 may be, for example, a commercially available or custom microprocessor. The electronic memory 235 (also referred to as memory) is representative of the one or more electronic memory devices including software and data used to provide network (e.g., Internet) access. The electronic memory 235 may include, but is not limited to, the following types of devices: cache, ROM (read only memory), PROM (programmable ROM), EPROM (erasable PROM), EEPROM (electrically erasable PROM), flash, RAM (random access memory), SRAM (static RAM), DRAM (dynamic RAMP), magnetic memory (such as magnetic disk memory), and/or optical memory (such as optical disk memory).

As shown in FIG. 2, the electronic memory 235 may include up to three or more categories of software and/or data: an operating system 265, a communication module 270, and a Web browser 275. The operating system 265 generally controls the operation of the mobile terminal 101. In particular, the operating system 265 may manage the mobile terminals software and/or hardware resources and may coordinate execution of programs by the processor 240. The communication module 270 may be configured to allow the mobile terminal 101 to establish communication sessions over the network 120. The Web browser 275 may be configured to access Web pages from the servers 111a-111n over the network 120 and to display selected Web pages and/or portions thereof on the electronic screen 225. Although FIG. 2 illustrates an exemplary software and hardware architecture that may be used to provide network access, it will be understood that the present invention is not limited to such a configuration, but is intended to encompass any configuration capable of carrying out the operations described herein.

Computer program code for carrying out operations of devices and/or systems discussed herein may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Embodiments of the present invention are described hereinafter with reference to flowchart and/or block diagram illustrations of methods, mobile terminals, electronic devices, communication networks, and/or computer program products. These flowchart and/or block diagram illustrations further illustrate exemplary operations of displaying pages of information (e.g., Web pages and/or HTML documents) in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
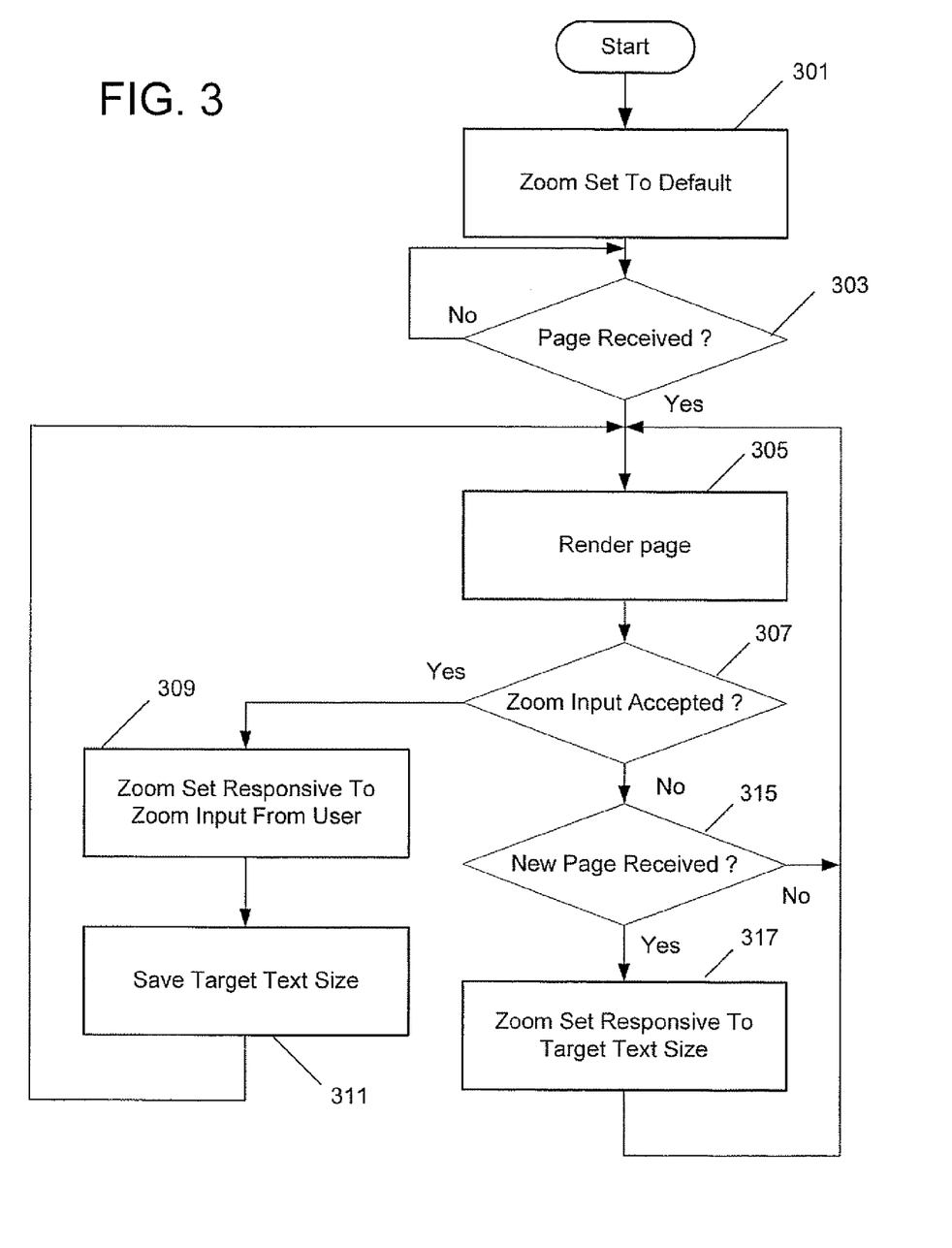
FIG. 3 is a flow chart illustrating operations of displaying information at mobile terminals according to some embodiments of the present invention.

FIG. 3 is a flow chart illustrating operations of displaying information on electronic screen 225 of mobile terminal 101 according to some embodiments of the present invention. More particularly, FIG. 3 illustrates operations of processor 240 running web browser 275 to display pages of information (such as Web pages and/or HTML documents received over network 120 and/or pages of information stored in memory 235).

At block 301, a default zoom setting may be stored in memory 235, and the default zoom setting may be determined when the mobile terminal is manufactured and permanently stored in read only memory, or the default zoom setting may be programmed/reprogrammed by a user of the mobile terminal 101. According to still other embodiments of the present invention, the default zoom setting may be the most recently used zoom setting before the mobile terminal was last turned off. Once a first page of information including first text is received by the processor 240 for display at block 303, the processor 240 may render (or display) the page of information on the electronic screen 225 at block 305 using the default zoom setting. The first page of information, for example, may be a Web page or HTML document received from a server over the network 120, or the first page of information may be a page of information saved in memory 235 (e.g., a menu page, a game page, a settings page, etc.).

After the first page of information has been rendered on electronic screen 225 using the default zoom setting, a user of the mobile terminal 101 may choose to zoom in (e.g., to provide greater magnification thereby displaying a smaller portion of the page) or zoom out on the first page of information (e.g., to provide lesser magnification thereby displaying a greater portion of the page). If a zoom input is received from a user of the mobile terminal 101 at block 307, the processor 240 may change the zoom setting responsive to the user input at block 309. The processor 240 may accept user input of a change of zoom setting, for example, though an element of a user interface such as a touch sensitive portion of the screen 220, a key or button of the keyboard/keypad 215, a dial, a joy stick, a track ball, etc. The first page of information including the first text may then be rendered (or displayed) by the processor 240 on the electronic screen 225 at the second zoom setting (different than the first zoom setting) at block 305 responsive to the zoom input accepted from the user.

In addition, a target text size may be saved by the processor 240 in electronic memory 235 at block 311, and the target text size may represent a size of the first text on the electronic screen at the most recently user selected zoom setting (e.g., at the second zoom setting). The target text size may then be used by the processor 240 to automatically select a zoom setting for subsequent display of a new page of information. As discussed in greater detail below, the target text size may be used to automatically normalize text size for one page of displayed information relative to a previously displayed page of information based on zoom input provided by a user with respect to the previously displayed page of information.

Operations of blocks 305, 307, 309, and 311 may be repeated any number of times for a same page of information for any number of zoom inputs accepted from a user at block 307 until a new page is received for rendering at block 315. While not shown in the flow diagram of FIG. 3 additional operations may be performed while rendering a page of information at block 305. If the page is rendered using a zoom setting so that less than the whole page is displayed, for example, the processor 240 may scroll (responsive to user input) to different portions of the page so that different portions of the page are rendered. When scrolling, for example, a same zoom setting may be maintained until another zoom input is received through the user interface at block 307.

If a second page of information including second text (different than the first text) is received by the processor 240 for display at block 315, the processor 240 may set the zoom responsive to the target text (saved in memory 235) at block 317. The processor 240 may then render (or display) the second page of information on the electronic screen 225 at block 305 using the zoom setting from block 317 (determined responsive to the target text size). The second page of information, for example, may be a Web page or HTML document received from a server over the network 120, or the second page of information may be a page of information saved in memory 235 (e.g., a menu page, a game page, a settings page, etc.).

Operations of FIG. 3 may be repeated for any number of pages to be displayed on the electronic screen 225 according to embodiments of the present invention. Once a zoom setting for a page has been changed responsive to user input and a corresponding text size has been saved, an initial zoom for a next page may be set responsive to the previously saved text size to normalize a displayed text size of the next page relative to a displayed text size of the preceding page at the user determined zoom setting for the preceding page. Accordingly, once a user has used a zoom feature to manually adjust a text size on a first page being viewed, the processor 240 may determine a desired text size that is saved as the target text size, and the processor 240 can automatically set the zoom for a subsequent page (different than the first page) so that text of the subsequent page is initially displayed at the target text size.

Each page of information rendered by the processor 240 on screen 225 at block 305 of FIG. 3 may include text and an image(s), and rendering a page of information at a particular zoom setting may include rendering the text and the image(s) on the electronic screen 225 at the particular zoom setting. Moreover, rendering the same page of information including the same text and image(s) at a different zoom setting responsive to user input at block 307 may include proportionally increasing or decreasing sizes of both the text and image(s) in response to the different zoom setting. Similarly, a new page (received at block 315) may include new text and a new image(s), and the second page may be rendered at a new zoom setting (set by processor 240 responsive to the target text size at block 317) so that the new text and the new image(s) are rendered on the electronic screen 225 at the new zoom setting.

According to some embodiments of the present invention, a first page received at block 303 may include text elements having a plurality of different sizes, and the target text size saved at block 311 may represent a predominate one of the plurality of different sizes of the text elements of the first page rendered on the electronic screen at the zoom setting provided responsive to user input at block 307. As user herein, a predominate one of the plurality of different text sizes may be a text size used with the greatest frequency on the page. Accordingly, if a second page received at block 315 includes text elements having a plurality of different sizes, an initial zoom setting for the second page may be set at block 317 so that a predominate one of the plurality of different sizes of the text elements of the second text rendered on the electronic screen is equal to the target text size.

According to some other embodiments of the present invention, a first page received at block 303 may include text elements having a plurality of different sizes, and the target text size saved at block 311 may represent an average of the plurality of different sizes of the text elements of the first page rendered on the electronic screen at the zoom setting provided responsive to user input at block 307. Accordingly, if a second page received at block 315 includes text elements having a plurality of different sizes, an initial zoom setting for the second page may be set at block 317 so that an average of the plurality of different sizes of the text elements of the second text rendered on the electronic screen is equal to the target text size.

According to still other embodiments of the present invention, a first page received at block 303 may include text elements having a plurality of different sizes, and the target text size saved at block 311 may represent a least one of the plurality of different sizes of the text elements of the first page rendered on the electronic screen at the zoom setting provided responsive to user input at block 307. Accordingly, if a second page received at block 315 includes text elements having a plurality of different sizes, an initial zoom setting for the second page may be set at block 317 so that a least one of the plurality of different sizes of the text elements of the second text rendered on the electronic screen is equal to the target text size.

According to yet other embodiments of the present invention, a first page received at block 303 may include text elements having a plurality of different sizes, and the target text size saved at block 311 may represent an intermediate one of the plurality of different sizes of the text elements of the first page rendered on the electronic screen at the zoom setting provided responsive to user input at block 307. Accordingly, if a second page received at block 315 includes text elements having a plurality of different sizes, an initial zoom setting for the second page may be set at block 317 so that an intermediate one of the plurality of different sizes of the text elements of the second text rendered on the electronic screen is equal to the target text size.

According to more embodiments of the present invention, a first page received at block 303 may include text elements having a plurality of different sizes, and the target text size saved at block 311 may represent a greatest one of the plurality of different sizes of the text elements of the first page rendered on the electronic screen at the zoom setting provided responsive to user input at block 307. Accordingly, if a second page received at block 315 includes text elements having a plurality of different sizes, an initial zoom setting for the second page may be set at block 317 so that a greatest one of the plurality of different sizes of the text elements of the second text rendered on the electronic screen is equal to the target text size.

As discussed above with respect to blocks 305, 307, 309, and 311, a page of information may be rendered at any number of different zoom settings responsive to user input accepted at block 307. In addition, the user may scroll from a first portion of the page to a second portion of the page while maintaining the same zoom setting. Stated in other words, a same zoom setting may be maintained for a page until another zoom setting is received from the user, and a zoom setting is not changed responsive to the target text size until a new page is received at block 315. Accordingly, automatic zoom selection may not be triggered when scrolling between different portions of a same page having different text sizes.

According to other embodiments of the present invention, automatic zoom selection may be triggered when scrolling between different portions of the same page to normalize different text sizes on different portions of a same page. For example, a first portion of a first page of information including first text may be rendered at a zoom setting provided responsive to user input at block 307, and the target text size represents a size of the text of the first portion. In response to user scrolling, a second portion of the first page including second text may be rendered at another zoom setting selected responsive to the target text size. In addition, the processor may apply a smoothing algorithm so that automatic zoom selection does not result in undesirably extreme variations in automatic zoom settings as the user scrolls across portions of the page having dramatically different text sizes. For example, the processor 240 may block automatic zoom selection during scrolling until after a displayed portion of the page has remained stationary for a predetermined period of time; the processor 240 may limit a range of automatic zoom selection during scrolling; and/or the processor 240 may gradually zoom from an initial zoom setting to a final zoom setting during scrolling by rendering at intermediate zoom settings between the initial and final zoom settings at a predetermined rate.

FIGS. 4a-4d and 5a-5e are screen shots illustrating rendering of pages of information according to embodiments of the present invention. In particular, operations of the flow chart of FIG. 3 will be discussed with respect to the screen shots of FIGS. 4a-4d taken from a cellular radiotelephone according to embodiments of the present invention.

Figure 4A:
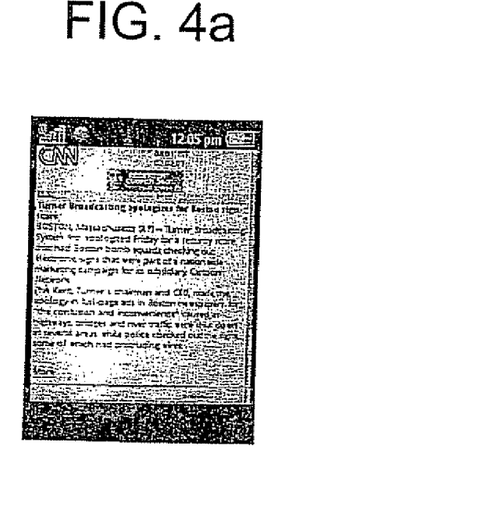
FIGS. 4a-4d and 5a-5e are screen shots illustrating rendering of pages of information according to embodiments of the present invention.

A page of information (such as a Web page from a remote server) may be received by the processor 240 at block 303 and rendered on the screen 225 (using a default zoom setting or a previous zoom setting) at block 305 as shown in FIG. 4a. The page of information, for example, may be received at the processor 240 responsive to a user request including an address or other identifying information for the page (such as a URL or Uniform Resource Locator) and/or responsive to a user selection of a link to the page. In addition, a size of the text of the page initially rendered on the screen 225 as shown in FIG. 4a may be dictated by a font/size defined by the source of the page of information (such as a font size defined by a remote server providing the Web page) and the current zoom setting (e.g., default zoom setting or previous zoom setting).

Figure 4B:
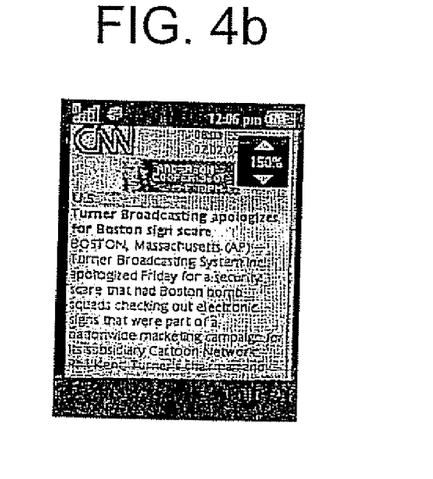

After viewing the initially rendered page as shown in FIG. 4a, the user may decide to increase a size of the rendered text by providing zoom input which may be accepted by the processor 240 at block 307. Responsive to accepting the zoom input, the processor may increase the zoom at block 309 to increase a size of the text of the page rendered at block 305 as shown in FIG. 4b. As further shown in FIG. 4b, non-text images of the page and text of the page may both be increased (or decreased) in size responsive to changing the zoom setting.

Figure 4C:
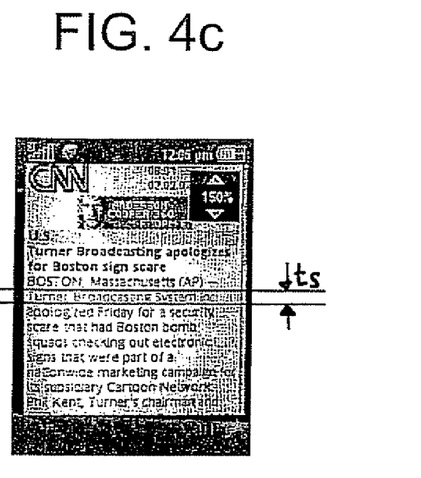

In addition, the processor 240 may determine a target text size ts at block 311, with the target text size ts representing a size of the text rendered on the screen 225 after changing the zoom setting, and the target text size ts may be saved at block 311. As shown in FIG. 4c, the target text size ts may represent a height of text (for example, in pixels) rendered on the screen 225 at the new zoom setting. According to embodiments of the present invention, the processor 240 may thus determine a text size desired by the user based on zoom input(s) provided by the user, and the processor 240 may then automatically adjust zoom settings for subsequently rendered pages to provide this desired text size.

Figure 4D:
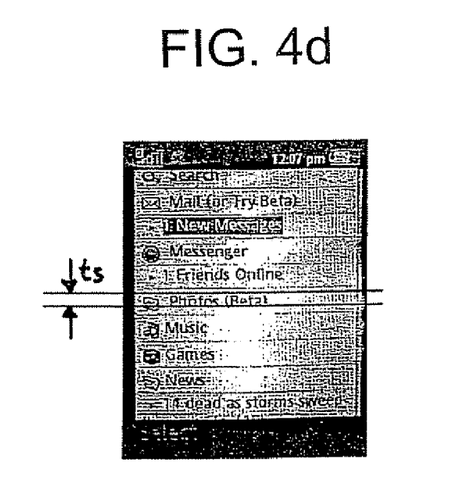

A new page of information (such as a menu page from memory 235 of the mobile terminal 101) may be received by the processor 240 at block 315, and the processor may use the previously saved target text size ts to provide an initial zoom setting at block 317 used to render the new page at block 305 as shown in FIG. 4d. If a source (or sources) of the two different pages define different font(s)/size(s) for text of the different pages, different zoom settings may be required for the different pages to obtain the same text size. Accordingly, the new page may be initially rendered on the screen 225 with text provided at the target text size ts. The new page of information, for example, may be received at the processor 240 responsive to a user request including an address or other identifying information for the new page (such as a URL or Uniform Resource Locator) and/or responsive to a user selection of a link to the new page.

According to some embodiments of the present invention, the automatic zoom adjustment feature may be disabled by the user so that a particular zoom setting is maintained by the processor 240 until a new zoom setting is manually requested by the user. FIGS. 5a-5e are screen shots illustrating rendering of different pages with the automatic zoom adjustment feature disabled.

Figure 5A:
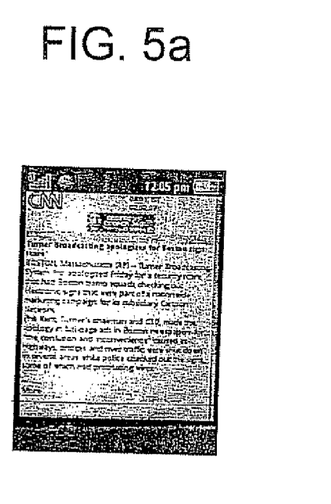

A page of information (such as a Web page from a remote server) may be received by the processor 240 at block 303 and rendered on the screen 225 (using a default zoom setting or a previous zoom setting) at block 305 as shown in FIG. 5a. The page of information, for example, may be received at the processor 240 responsive to a user request including an address or other identifying information for the page (such as a URL or Uniform Resource Locator) and/or responsive to a user selection of a link to the page. In addition, a size of the text of the page initially rendered on the screen 225 as shown in FIG. 5a may be dictated by a font/size defined by the source of the page of information (such as a font size defined by a remote server providing the Web page) and the current zoom setting (e.g., default zoom setting or previous zoom setting).

Figure 5B:
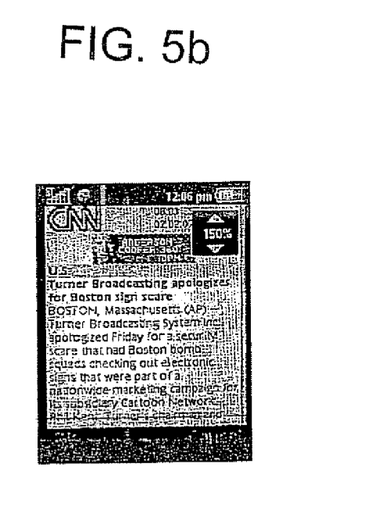

After viewing the initially rendered page as shown in FIG. 5a, the user may decide to increase a size of the rendered text by providing zoom input which may be accepted by the processor 240 at block 307. Responsive to accepting the zoom input, the processor may increase the zoom at block 309 to increase a size of the text of the page rendered at block 305 as shown in FIG. 5b. As further shown in FIG. 5b, non-text images of the page and text of the page may both be increased (or decreased) in size responsive to changing the zoom setting. With the automatic zoom feature disabled, there is no need to save a target text size. Instead, a most recently applied zoom setting may be applied to the current and subsequent pages until a new zoom setting is manually requested by the user.

Figure 5C:
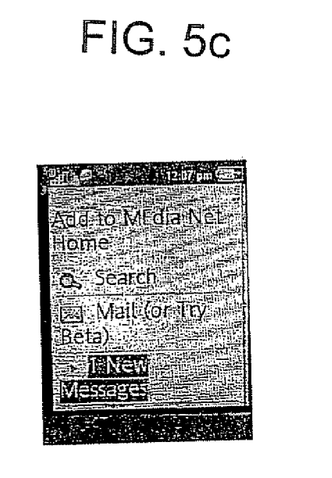
Figure 5D:
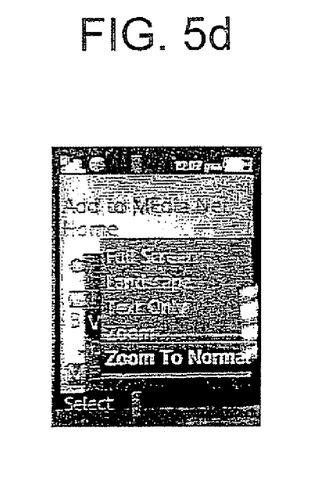
Figure 5E:
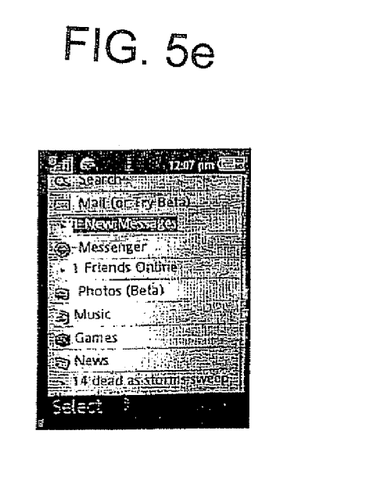

If a new page of information (such as a menu page from memory 235 of the mobile terminal 101) is received by the processor 240 at block 315, operations of block 317 may be omitted, and the last zoom setting of FIG. 5b may be applied to render the new page at block 305 as shown in FIG. 5c. Because sources of the two different pages define different font(s)/size(s) for text of the different pages, the same zoom setting results in different text sizes as shown in FIGS. 5b and 5c. Accordingly, the new page may be initially rendered on the screen 225 with significantly larger text. The user may thus choose to zoom back (to a lower magnification). Accordingly, user input of a different zoom setting may be accepted at block 307 as shown in FIG. 5d, and the page may be rendered at the new zoom setting at block 305 as shown in FIG. 5e. With automatic zoom setting disabled, the user may manually adjust each page to obtain a desired text size.

As shown in FIGS. 4a-4d and 5a-5e, zoom operations according to some embodiments of the present invention may result in proportional increases/decreases in sizes of text and non-text images on a page, and text may be reformatted after a zoom operation. More particularly, text reformatting may provide that a number of text characters per line changes at different zoom settings so that text does not run off lateral edges of the screen at greater magnification and so that a larger number of characters are provided per line at lower magnification. According to other embodiments of the present invention, zoom operations may be provided without reformatting the text. Without reformatting, text may run off lateral edges of the screen at greater magnification, and margins may result between text and edges of the screen at lower magnifications.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of displaying pages of information on an electronic screen, the method comprising:
    receiving a first page of information including first text;
    rendering the first page of information including the first text on the electronic screen at a first zoom setting;
    after rendering the first page of information at the first zoom setting, accepting zoom input from a user through a user interface;
    rendering the first page of information including the first text on the electronic screen at a second zoom setting different than the first zoom setting responsive to the zoom input;
    saving in electronic memory a target text size representing a size of the first text on the electronic screen at the second zoom setting;
    receiving a second page of information including second text different than the first text;
    determining a third zoom setting responsive to the target text size and responsive to the second text; and
    rendering the second page of information including the second text on the electronic screen at a third zoom setting;
    wherein determining the third zoom setting comprises determining the third zoom setting responsive to the target text size and responsive to the second text to normalize a size of the second text rendered on the electronic screen at the third zoom setting relative to a size of the first text rendered on the electronic screen at the second zoom setting.

2. A method according to claim 1 wherein the first page of information includes the first text and a first image, wherein rendering the first page of information at the first zoom setting comprises rendering the first text and the first image on the electronic screen at the first zoom setting, and wherein rendering the first page of information at the second zoom setting comprises rendering the first text and the first image on the electronic screen at the second zoom setting.

3. A method according to claim 2 wherein the second page of information includes the second text and a second image, and wherein rendering the second page of information at the third zoom setting comprises rendering the second text and the second image on the electronic screen at the third zoom setting.

4. A method according to claim 1 wherein the second and third zoom settings are different.

5. A method according to claim 1 wherein the first text includes text elements having a plurality of different sizes, and wherein the target text size represents a predominate one of the plurality of different sizes of the text elements of the first text rendered on the electronic screen at the second zoom setting.

6. A method according to claim 1 wherein the first text includes text elements having a plurality of different sizes, and wherein the target text size represents a least one of the plurality of different sizes of the text elements of the first text rendered on the electronic screen at the second zoom setting.

7. A method according to claim 1 wherein the first text includes text elements having a plurality of different sizes, and wherein the target text size represents an intermediate one of the plurality of different sizes of the text elements of the first text rendered on the electronic screen at the second zoom setting.

8. A method according to claim 1 wherein the first text includes text elements having a plurality of different sizes, and wherein the target text size represents a greatest one of the plurality of different sizes of the text elements of the first text rendered on the electronic screen at the second zoom setting.

9. A method according to claim 1 wherein the second text includes text elements having a plurality of different sizes, and wherein determining the third zoom setting comprises determining the third zoom setting so that a predominate one of the plurality of different sizes of the text elements of the second text rendered on the electronic screen at the third zoom setting is equal to the target text size.

10. A method according to claim 1 wherein the second text includes text elements having a plurality of different sizes, and wherein determining the third zoom setting comprises determining the third zoom setting so that a least one of the plurality of different sizes of the text elements of the second text rendered on the electronic screen at the third zoom setting is equal to the target text size.

11. A method according to claim 1 wherein the second text includes text elements having a plurality of different sizes, and wherein determining the third zoom setting comprises determining the third zoom setting so that an intermediate one of the plurality of different sizes of the text elements of the second text rendered on the electronic screen at the third zoom setting is equal to the target text size.

12. A method according to claim 1 wherein the second text includes text elements having a plurality of different sizes, and wherein determining the third zoom setting comprises determining the third zoom setting so that a greatest one of the plurality of different sizes of the text elements of the second text rendered on the electronic screen at the third zoom setting is equal to the target text size.

13. A method according to claim 1 wherein the electronic screen comprises an electronic screen of a handheld electronic device.

14. A method according to claim 1 wherein rendering the first page of information at the second zoom setting comprises,
    rendering a first portion of the first page of information including a first portion of the first text at the second zoom setting, and
    rendering a second portion of the first page of information including a second portion of the first text at the second zoom setting wherein the first and second portions of the first text have different text sizes.

15. A method according to claim 1 wherein rendering the first page of information at the second zoom setting comprises,
    rendering a first portion of the first page of information including a first portion of the first text at the second zoom setting, wherein the target text size represents a size of text of the first portion of the first text, and
    rendering a second portion of the first page of information including a second portion of the first text at a fourth zoom setting wherein the first and second portions of the first text have different text sizes, and wherein the fourth zoom setting is selected responsive to the target text size and a size of text of the second portion of the first text.

16. A method according to claim 15 wherein rendering the first and second portions of the first page comprises scrolling from the first portion of the first page to the second portion of the first page.

17. A method according to claim 15 wherein rendering the second portion of the first page comprises rendering a portion of the first page at an intermediate zoom setting between the first and fourth zoom settings before rendering the second portion of the first page at the fourth zoom setting.

18. A method of displaying pages of information on an electronic screen, the method comprising:
    receiving a first page of information including first text;
    rendering the first page of information including the first text on the electronic screen at a first zoom setting;
    after rendering the first page of information at the first zoom setting, accepting zoom input from a user through a user interface;
    rendering the first page of information including the first text on the electronic screen at a second zoom setting different than the first zoom setting responsive to the zoom input wherein rendering the first page of information at the second zoom setting comprises,
        rendering a first portion of the first page of information including a first portion of the first text at the second zoom setting, wherein the target text size represents a size of text of the first portion of the first text, and
        rendering a second portion of the first page of information including a second portion of the first text at a fourth zoom setting wherein the first and second portions of the first text have different text sizes, and wherein the fourth zoom setting is selected responsive to the target text size and a size of text of the second portion of the first text, wherein rendering the first and second portions of the first page comprises scrolling from the first portion of the first page to the second portion of the first page; saving in electronic memory a target text size representing a size of the first text on the electronic screen at the second zoom setting;
    receiving a second page of information including second text different than the first text;
    determining a third zoom setting responsive to the target text size and responsive to the second text; and
    rendering the second page of information including the second text on the electronic screen at a third zoom setting.

19. A method of displaying pages of information on an electronic screen, the method comprising:
    receiving a first page of information including first text;
    rendering the first page of information including the first text on the electronic screen at a first zoom setting;
    after rendering the first page of information at the first zoom setting, accepting zoom input from a user through a user interface;
    rendering the first page of information including the first text on the electronic screen at a second zoom setting different than the first zoom setting responsive to the zoom input, wherein rendering the first page of information at the second zoom setting comprises,
        rendering a first portion of the first page of information including a first portion of the first text at the second zoom setting, wherein the target text size represents a size of text of the first portion of the first text, and
        rendering a second portion of the first page of information including a second portion of the first text at a fourth zoom setting wherein the first and second portions of the first text have different text sizes, and wherein the fourth zoom setting is selected responsive to the target text size and a size of text of the second portion of the first text, wherein rendering the second portion of the first page comprises rendering a portion of the first page at an intermediate zoom setting between the first and fourth zoom settings before rendering the second portion of the first page at the fourth zoom setting;

saving in electronic memory a target text size representing a size of the first text on the electronic screen at the second zoom setting;

receiving a second page of information including second text different than the first text;

determining a third zoom setting responsive to the target text size and responsive to the second text; and rendering the second page of information including the second text on the electronic screen at a third zoom setting.

* * * * *